US012701542B2

(12) United States Patent
Hirzallah et al.

(10) Patent No.: US 12,701,542 B2
(45) Date of Patent: Aug. 4, 2026

(54) GRAPHICAL POSITIONING REFERENCE UNIT

(71) Applicant: QUALCOMM Incorporated, San Diego, CA (US)

(72) Inventors: Mohammed Ali Mohammed Hirzallah, San Diego, CA (US); Rajat Prakash, San Diego, CA (US); Xiaoxia Zhang, San Diego, CA (US); Bala Ramasamy, San Marcos, CA (US)

(73) Assignee: QUALCOMM Incorporated, San Diego, CA (US)

(*) Notice: Subject to any disclaimer, the term of this patent is extended or adjusted under 35 U.S.C. 154(b) by 314 days.

(21) Appl. No.: 18/464,109

(22) Filed: Sep. 8, 2023

(65) Prior Publication Data

US 2025/0089015 A1 Mar. 13, 2025

(51) Int. Cl.
*H04W 64/00* (2009.01)
*G01S 5/00* (2006.01)
*G01S 5/02* (2010.01)

(52) U.S. Cl.
CPC ......... *H04W 64/006* (2013.01); *G01S 5/0018* (2013.01); *G01S 5/0236* (2013.01)

(58) Field of Classification Search
CPC ......... H04W 4/029; H04W 4/40; H04W 4/38; H04W 4/44; H04W 4/90; H04W 4/80; H04W 4/02; H04W 64/00; H04W 4/46; H04W 4/027; H04W 16/18; H04W 4/025; H04W 4/33; H04W 48/20; H04W 76/50
See application file for complete search history.

(56) References Cited

U.S. PATENT DOCUMENTS

| | | | | |
|---|---|---|---|---|
| 9,301,096 | B2* | 3/2016 | Beauregard | G01S 13/765 |
| 11,424,812 | B1 | 8/2022 | Zhu et al. | |
| 2013/0311140 | A1* | 11/2013 | Schechter | H04L 67/34 |
| | | | | 702/188 |
| 2022/0132463 | A1* | 4/2022 | Cha | H04B 17/27 |

(Continued)

FOREIGN PATENT DOCUMENTS

| | | | |
|---|---|---|---|
| EP | 2445759 | B1 | 8/2013 |
| WO | 2019175130 | A1 | 9/2019 |
| WO | 2023069311 | A1 | 4/2023 |

OTHER PUBLICATIONS

Partial International Search Report—PCT/US2024/044391—ISA/EPO—Jan. 3, 2025.

(Continued)

*Primary Examiner* — Kwasi Karikari
(74) *Attorney, Agent, or Firm* — Procopio, Cory, Hargreaves & Savitch LLP

(57) ABSTRACT

A positioning reference assistance entity (PRAE) for providing positioning data to a network entity of a communication network having at least one transmission/reception point (TRP), the PRAE comprising: at least one sensor; at least one transceiver; at least one memory; and at least one processor, in signal communication with the at least one transceiver and the at least one memory, configured to: acquire physical sensory information, from the at least one sensor, of an environment in which the PRAE and the TRP are located; and transmit, via the at least one transceiver, the positioning data to the network entity based on the physical sensory information.

30 Claims, 12 Drawing Sheets

(56)　　　　References Cited

U.S. PATENT DOCUMENTS

| 2022/0338203 A1 * | 10/2022 | Cha .................... H04W 72/542 |
| 2023/0146887 A1 | 5/2023 | Metwaly Saad et al. |
| 2023/0262643 A1 | 8/2023 | Zach et al. |

OTHER PUBLICATIONS

International Search Report and Written Opinion—PCT/US2024/044391—ISA/EPO—Mar. 25, 2025.

* cited by examiner

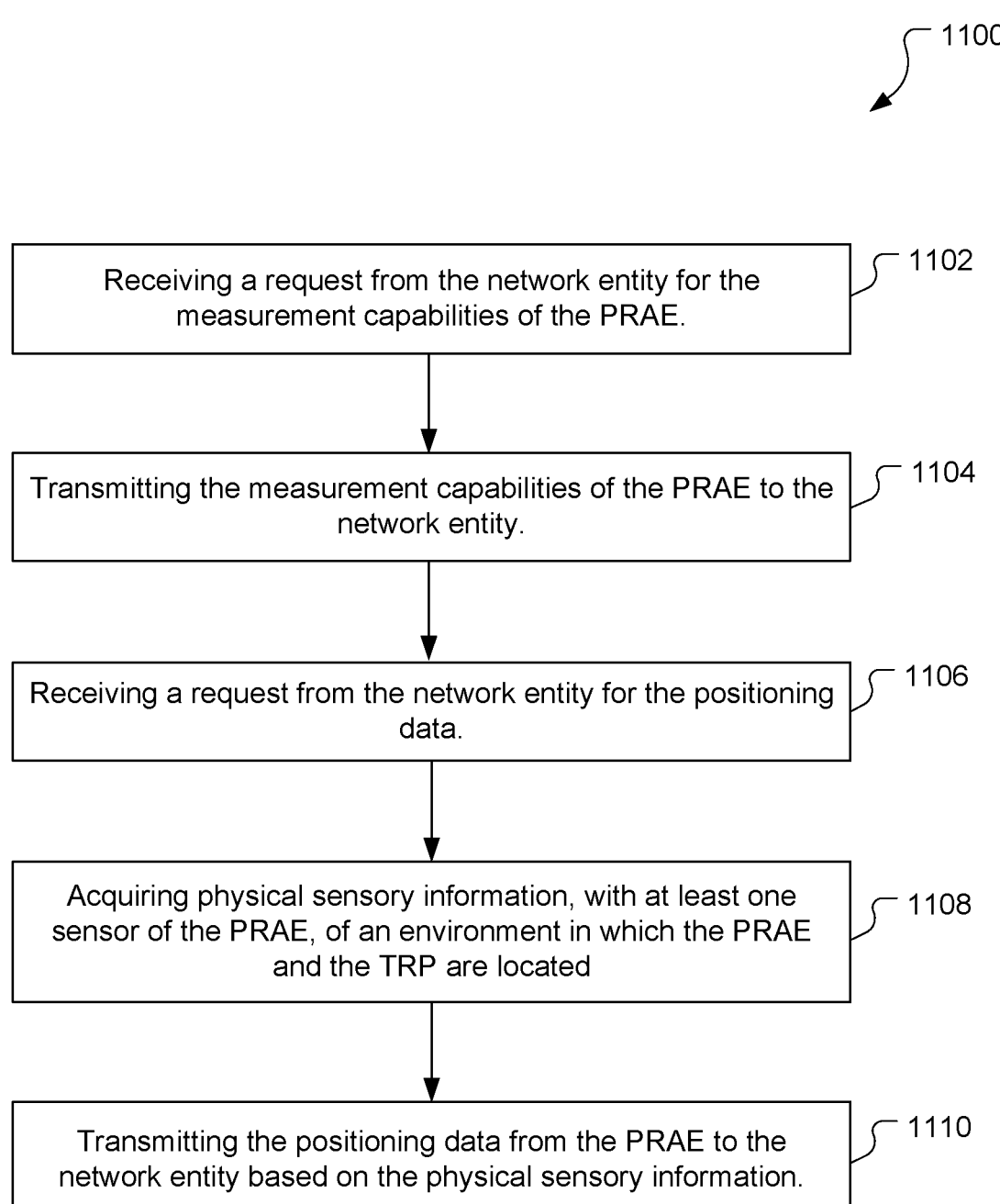

1100

Receiving a request from the network entity for the measurement capabilities of the PRAE. — 1102

Transmitting the measurement capabilities of the PRAE to the network entity. — 1104

Receiving a request from the network entity for the positioning data. — 1106

Acquiring physical sensory information, with at least one sensor of the PRAE, of an environment in which the PRAE and the TRP are located — 1108

Transmitting the positioning data from the PRAE to the network entity based on the physical sensory information. — 1110

*FIG. 11*

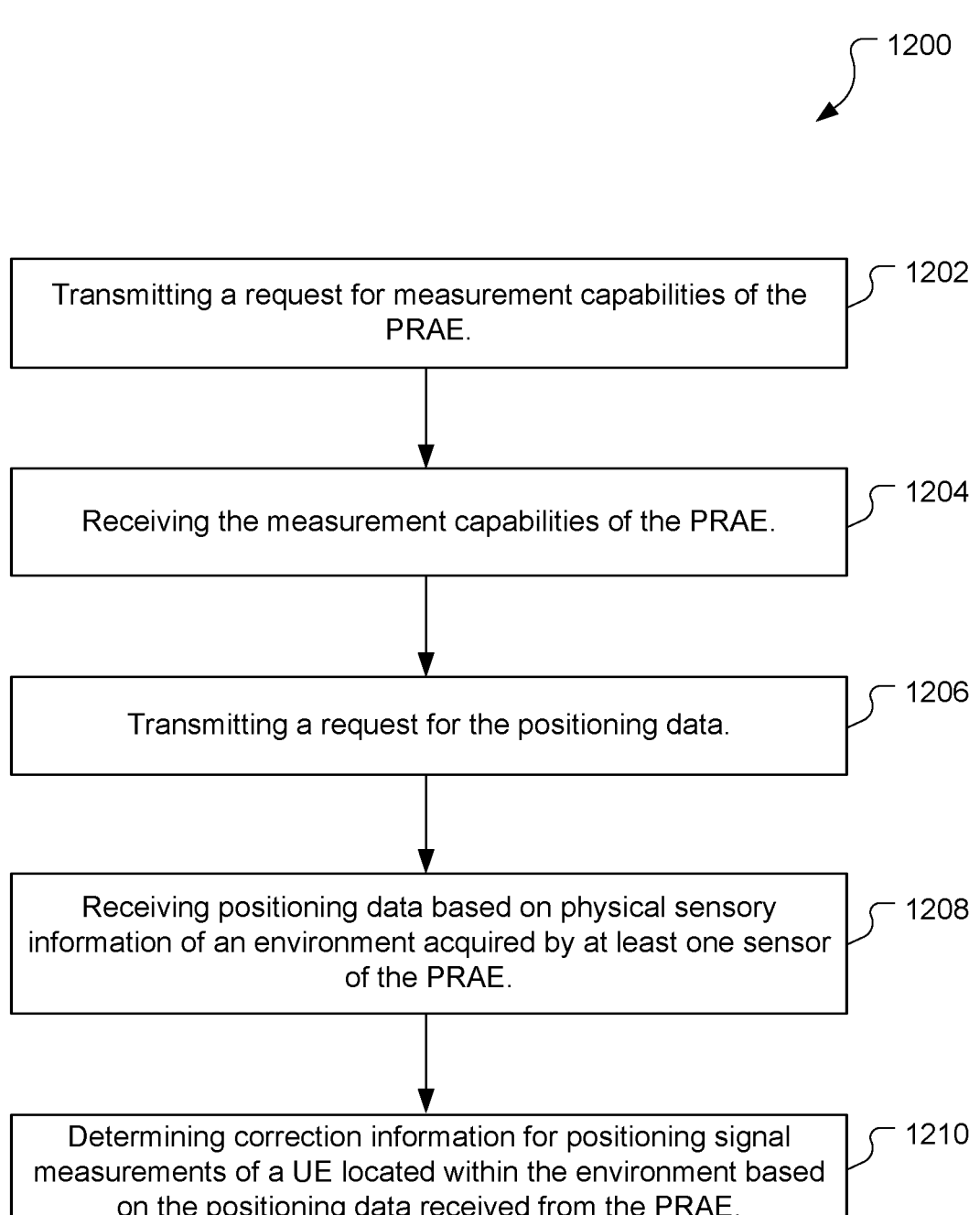

1200

Transmitting a request for measurement capabilities of the PRAE.  1202

Receiving the measurement capabilities of the PRAE.  1204

Transmitting a request for the positioning data.  1206

Receiving positioning data based on physical sensory information of an environment acquired by at least one sensor of the PRAE.  1208

Determining correction information for positioning signal measurements of a UE located within the environment based on the positioning data received from the PRAE.  1210

*FIG. 12*

GRAPHICAL POSITIONING REFERENCE UNIT

BACKGROUND

Field of the Disclosure

The field of the disclosure is positioning reference units and more particularly positioning reference units that utilize graphical information.

Description of Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

It is often desirable to be able to determine locations of mobile devices. Positioning Reference Signals (PRS) may be transmitted and measured to help determine a position of a mobile device. Obstacles in an environment containing a mobile device whose position is desired to be determined may affect an ability to determine the position of the mobile device accurately.

SUMMARY

An example positioning reference assistance entity (PRAE) for providing positioning data to a network entity of a communication network having at least one transmission/reception point (TRP) includes: at least one sensor; at least one transceiver; at least one memory; and at least one processor, in signal communication with the at least one transceiver and the at least one memory, configured to: acquire physical sensory information, from the at least one sensor, of an environment in which the PRAE and the TRP are located; and transmit, via the at least one transceiver, the positioning data to the network entity based on the physical sensory information.

An example method for providing positioning data to a network entity of a communication network having at least one transmission/reception point (TRP) utilizing a positioning reference assistance entity (PRAE) includes: acquiring physical sensory information, with at least one sensor of the PRAE, of an environment in which the PRAE and the TRP are located; and transmitting the positioning data from the PRAE to the network entity based on the physical sensory information.

Another example positioning reference assistance entity (PRAE) for providing positioning data to a network entity of a communication network having at least one transmission/reception point (TRP) includes: means for acquiring physical sensory information, with at least one sensor of the PRAE, of an environment in which the PRAE and the TRP are located; and means for transmitting the positioning data from the PRAE to the network entity based on the physical sensory information.

An example non-transitory processor-readable storage medium comprising processor-readable instructions configured to cause one or more processors to providing positioning data to a network entity of a communication network having a positioning reference assistance entity (PRAE) and at least one transmission/reception point (TRP) includes code for acquiring physical sensory information, from at least one sensor, of an environment in which the PRAE and the TRP are located; and code for transmitting, via at least one transceiver, the positioning data to the network entity based on the physical sensory information.

BRIEF DESCRIPTION OF THE DRAWINGS

Components in the figures are not necessarily to scale.

FIG. 11 is a flowchart diagram of a method for the providing positioning data from the PRAE to the network entity shown in FIG. 5.

FIG. 12 is a flowchart diagram of a method for receiving the positioning data from the PRAE at the network entity shown in FIG. 5.

DETAILED DESCRIPTION

Figure 1:
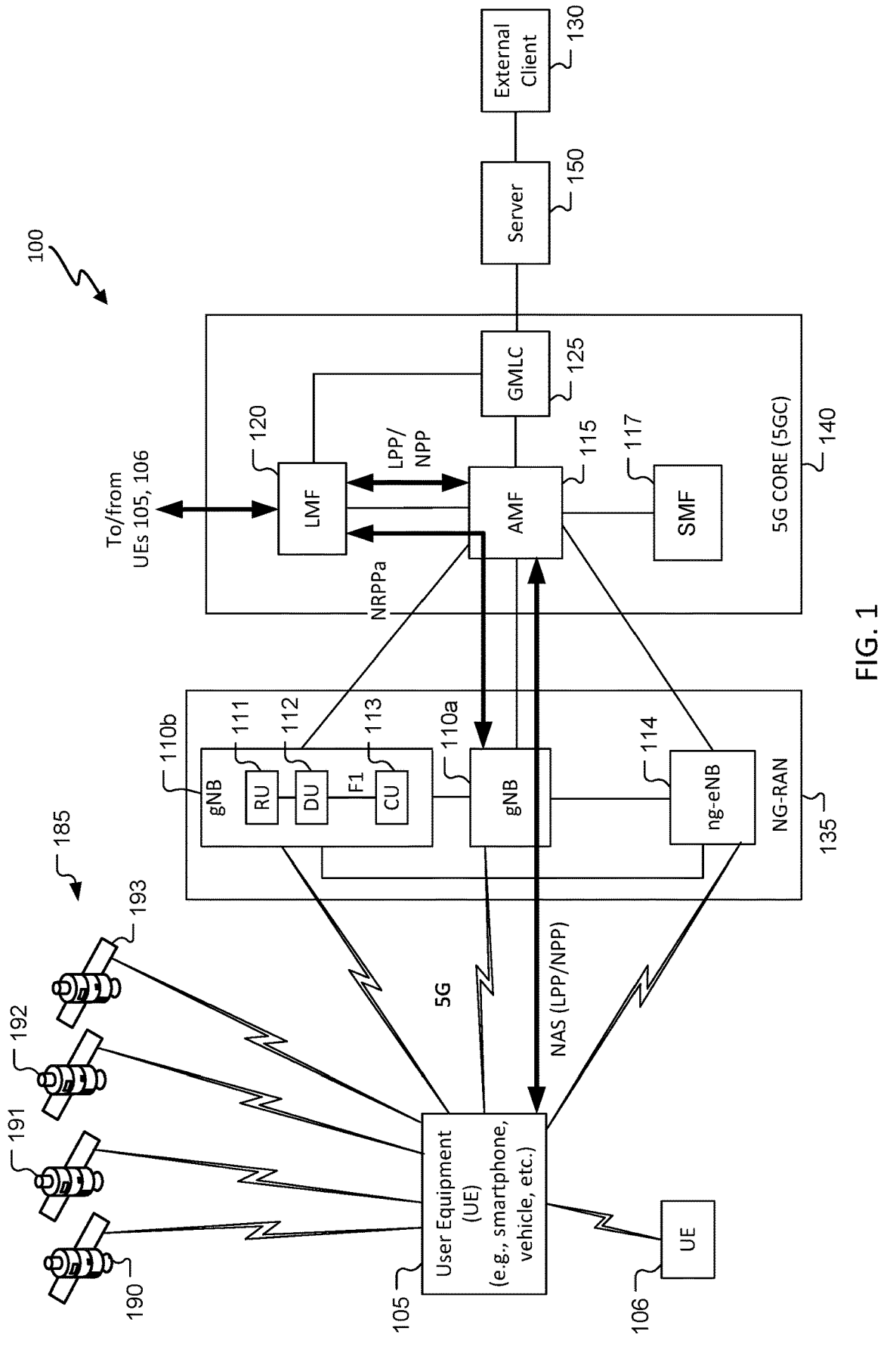
FIG. 1 is a simplified diagram of an example wireless communications system.

Techniques are discussed herein for providing positioning data to a network entity of a communication network having at least one transmission/reception point (TRP) utilizing a positioning reference assistance entity (PRAE). For example, the PRAE may include at least one sensor, at least one transceiver, at least one memory, and at least one processor, in signal communication with the at least one transceiver and the at least one memory. The at least one processor may be configured to: acquire physical sensory information, from the at least one sensor, of an environment in which the PRAE and the TRP are located; and transmit, via the at least one transceiver, the positioning data to the network entity based on the physical sensory information.

Also discussed herein is a network entity that includes at least one transceiver; at least one memory; and at least one processor, in signal communication with the at least one transceiver, and the at least one memory. The at least one processor is configured to: receive, from the PRAE via the at least one transceiver, positioning data based on physical sensory information of an environment acquired by at least one sensor of the PRAE, wherein the PRAE and the at least one TRP are located within the environment; and determine correction information for positioning signal measurements of user equipment (UE) located within the environment based on the positioning data received from the PRAE. Other configurations, however, may be used.

As an example, location servers, such as, for example, Location Management Functions (LMFs) communicate with PRUs for calibration information utilizing NR measurements during positioning. Particular aspects of the subject matter described in this disclosure can be implemented to realize one or more of the following potential advantages. For example, the PRAE may extend the PRU functionality to include graphical (e.g. visual, thermal, LiDAR etc.) and acoustic measurements from the positioning environment so that it behaves like a graphical reference unit (GRU) (only graphical/acoustic measurements) or a graphical positioning reference unit (GPRU) (both NR and graphical/acoustic measurements).

In some examples, the PRUs may be utilized for calibration purposes in environments that may have blockages and/or reflectors present that may degrade location services for a UE located within the environment. The PRU functionality with NR measurements may allow for calibrating the location services of the UE in the environment to help improve the accuracy of the location services; however, the other techniques (as described herein) that utilize graphical measurements may also be useful for calibrating enhanced positioning or providing monitoring an environment for changes in the environment. As an example, techniques can be used for comparing the correlation of visual, thermal, light detection and ranging (LiDAR), and/or acoustic measurements over time may indicate a change in the environment. As such, a communication system having a network entity that includes a location server and a PRAE may allow graphical unit functionality in which the location server can coordinate with the PRAE (that may act as a graphical and/or acoustic anchor) to obtain graphical, imagery, and/or acoustic measurements from the environment. By utilizing a PRAE, the location server may be enabled to collect graphical, imagery, and/or acoustic measurements from the environment and utilize it for hybrid positioning or monitoring significant changes in the environment.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a. 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a. 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a. 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks.

For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
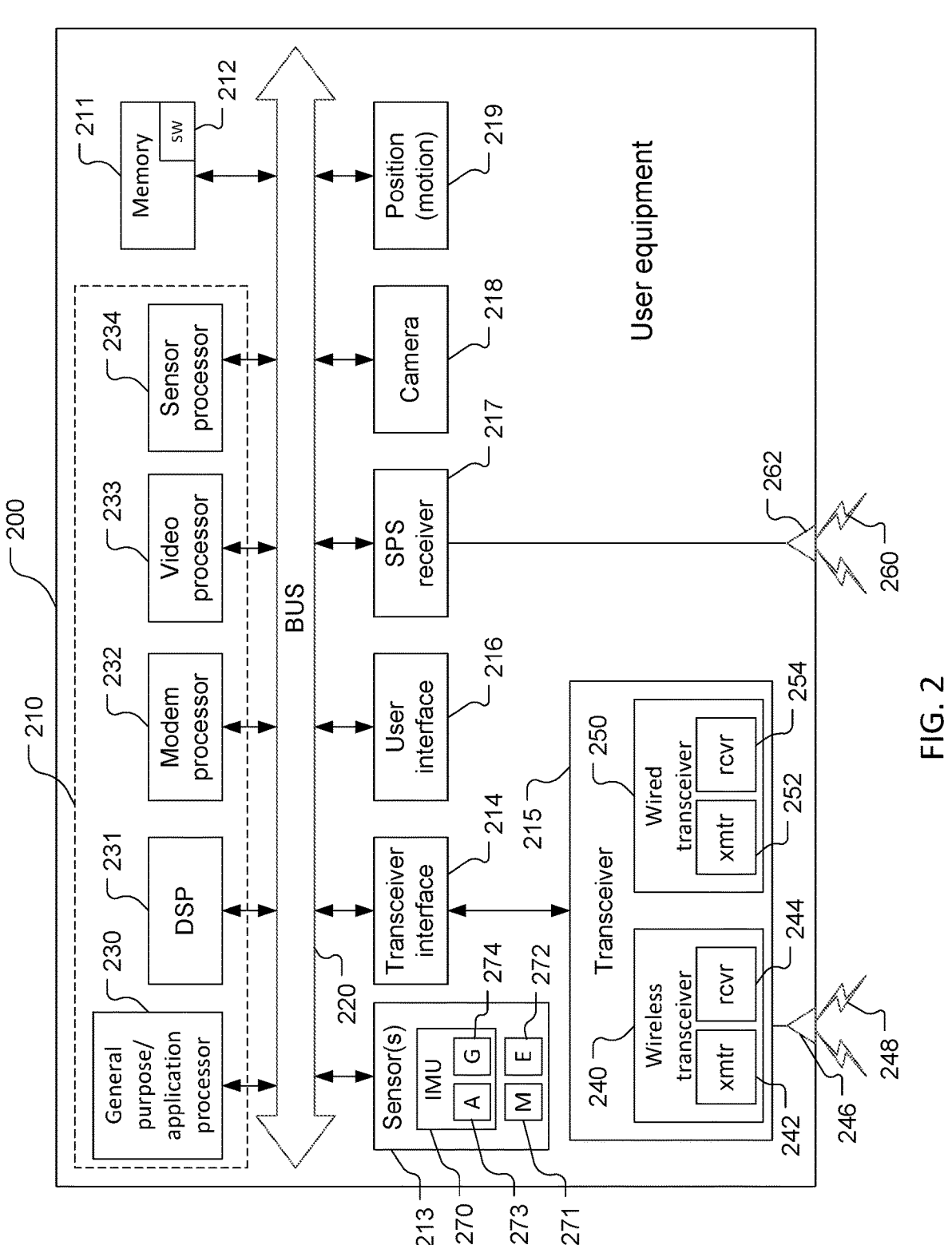
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/ application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/ application processor 230, the transceiver 215, the SPS receiver 217, and/or another component of the UE 200, and may be provided by hardware, software, firmware, or various combinations thereof.

Figure 3:
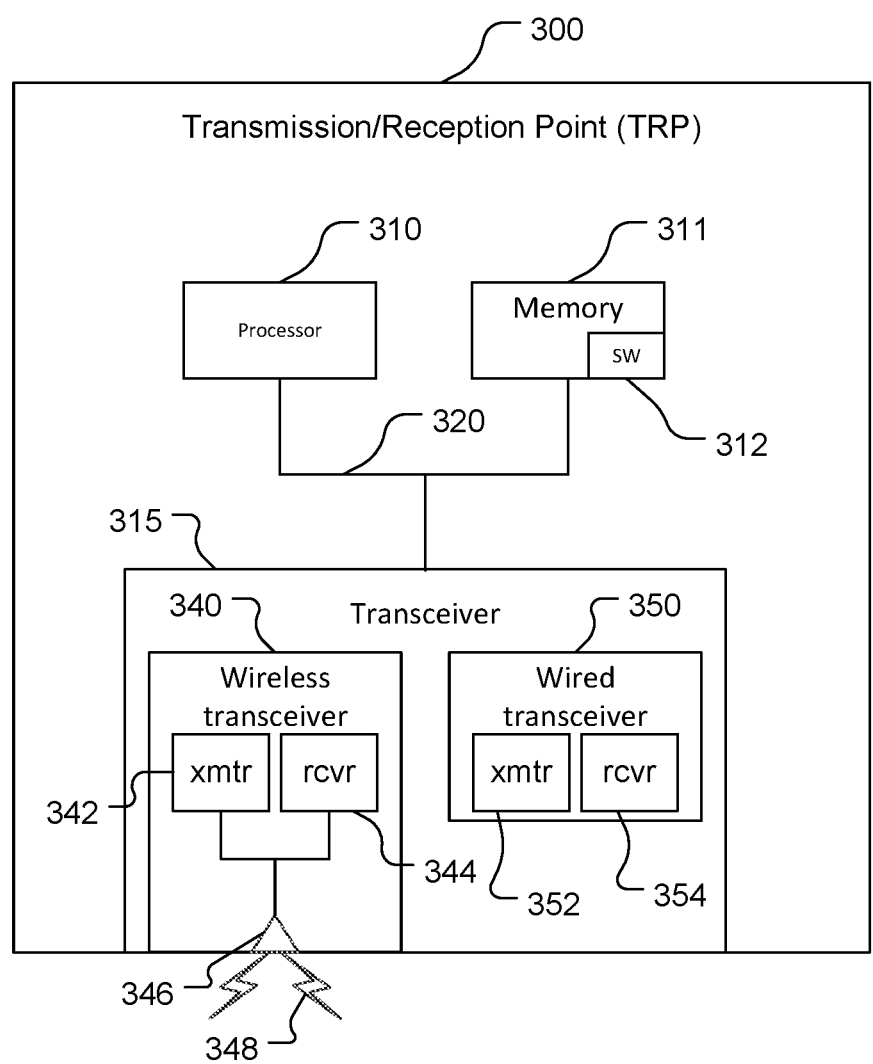
FIG. 3 is a block diagram of components of an example transmission/reception point.

Referring also to FIG. 3, an example of a TRP 300 of the gNBs 110a, 110b and/or the ng-eNB 114 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
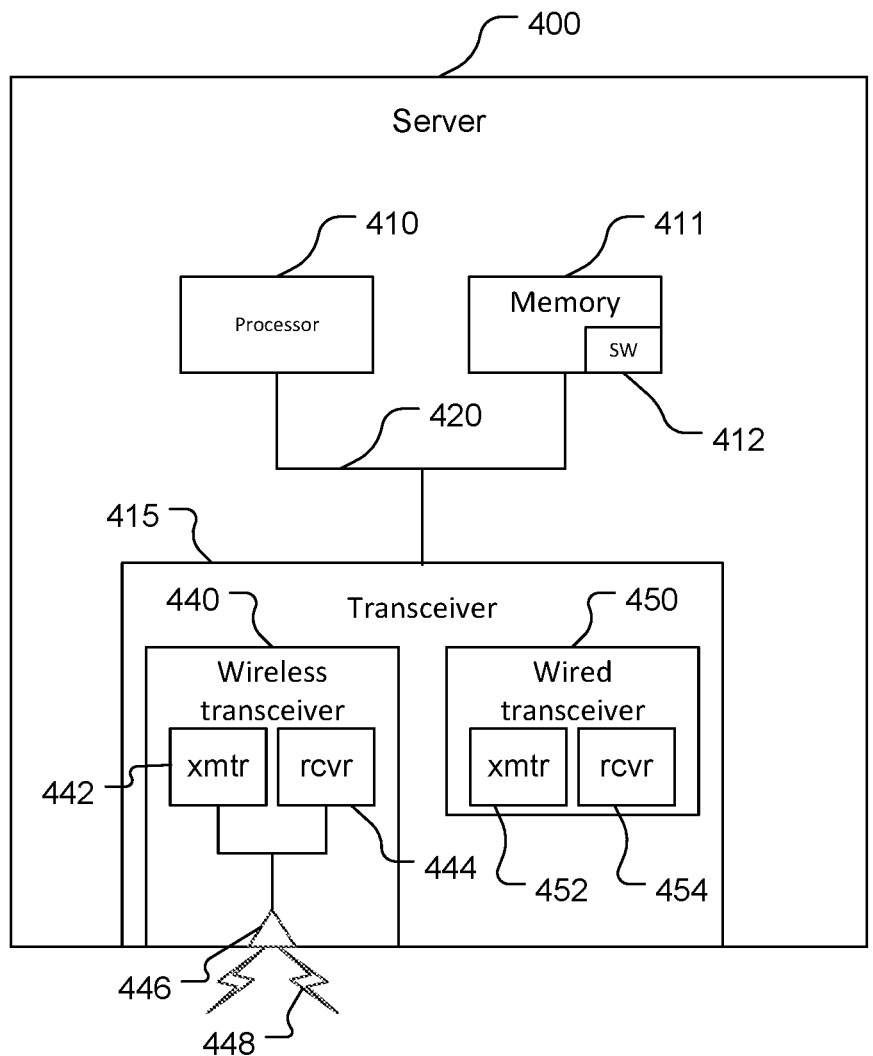
FIG. 4 is a block diagram of components of a server, various examples of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference TRx-Tx (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference TTx-Rx between the transmission time of the RTT measurement signal from the base station and the ToA of the RTT response at the base station to the UE-reported time difference TRx-Tx, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
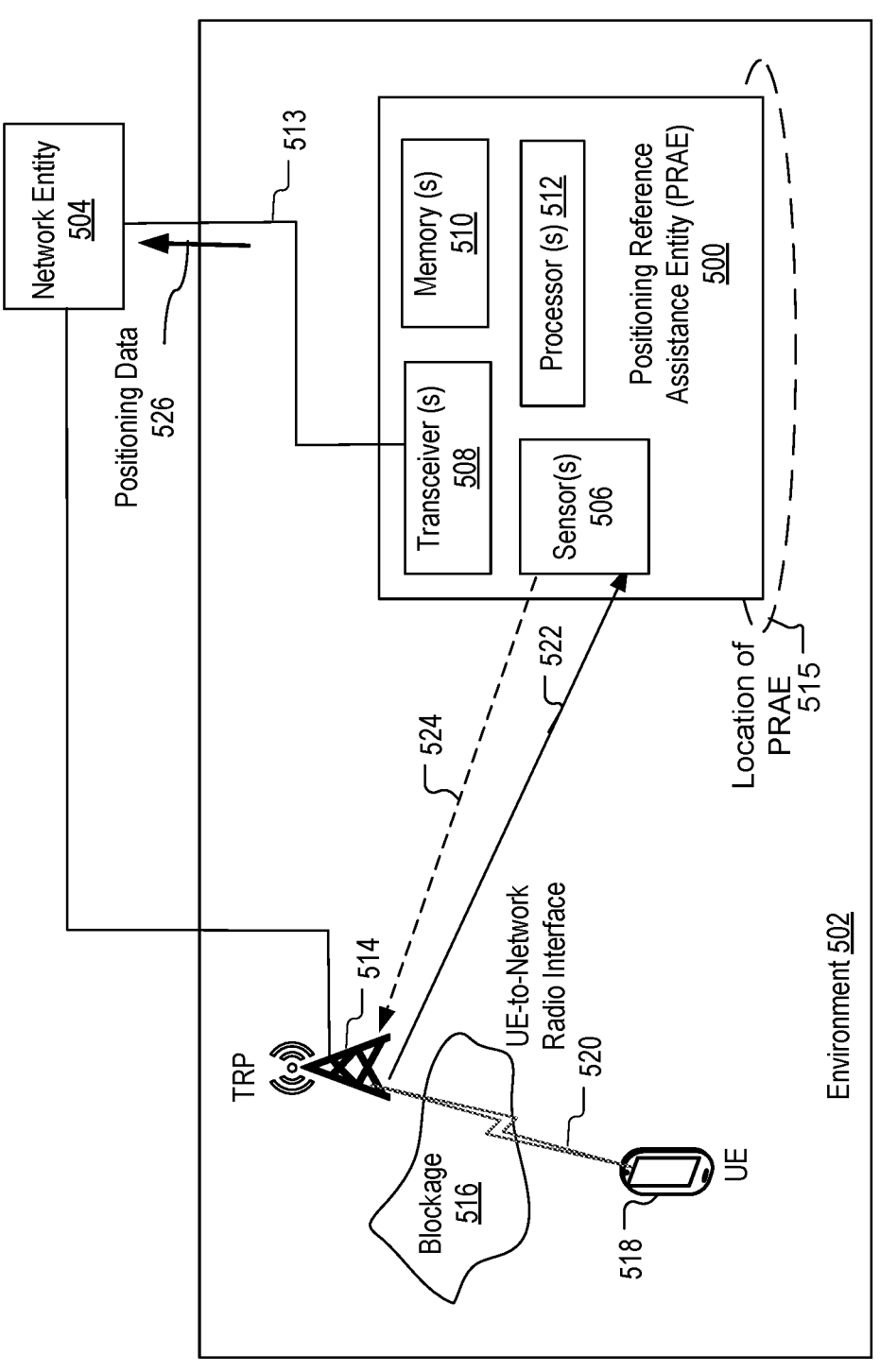
FIG. 5 is a block diagram of a positioning reference assistance entity (PRAE) within an environment and in communication with a network entity/server shown in FIG. 4.

Turning to FIG. 5, a system block diagram of a positioning reference assistance entity (PRAE) 500 within an environment 502 and in signal communication with a network entity 504 (e.g., the 5G Core 140 shown in FIG. 1) is shown. The PRAE 500 may include at least one sensor 506, at least one transceiver 508, at least one memory 510, and at least one processor 512, where the at least one processor 512 may be in signal communication with the at least one sensor 506, at least one transceiver 508, and at least one memory 510. The at least one transceiver 508 may be in signal communication with the network entity 504 via a signal path 513 that may be a wired or a wireless connection such as, for an example, a UE-to-network radio interface. In general, the PRAE 500 may be a mobile device, such as, for example, a UE or a stationary device located 515 at a fixed location that is known to the network entity 504. Examples of a fixed location PRAE 500 may include indoor or outdoor devices that are at fixed locations within the environment 502 inside or outside of buildings or other structures within the environment 502. If the PRAE 500 is at a known location within the environment, the PRAE 500 may be referred to as a graphical, acoustic, and/or radar anchor configured to obtain graphical, imagery, acoustic, and/or radar measurements of the environment 502 from a known fixed location within the environment 502. In this example, the PRAE 500 enables the network entity 504 to collect imagery, acoustic, or radar measurements of the environment 502 so as to use these measurements for hybrid positioning applications and/or monitoring any significant changes in the environment 502. Moreover, the PRAE 500 may be configured to allow functionalities and communication between the PRAE 500 and network entity 504 utilizing LPP or NPP.

The network entity 504 may be, for example, an LMF (as described earlier as LMF 120), a 5G Core (as described earlier as 5G Core 140 that includes an LMF 120), and/or a server (as described earlier as server 400 shown in FIG. 4). Similar to the PRAE 500, the network entity 504 may also include at least one transceiver, at least one memory, and at least one processor, in signal communication with the at least one transceiver, and the at least one memory.

In this example, the at least one processor 512 may include one or more hardware devices, e.g., a CPU, a microcontroller, an ASIC, etc. The at least one processor 512 may comprise multiple processors including a general-purpose/application processor, a DSP, a modem processor, a video processor, and/or a sensor processor. One or more of the at least one processor 512 may comprise multiple devices (e.g., multiple processors). The at least one memory 510 may be a non-transitory storage medium that may include RAM, flash memory, disc memory, and/or ROM, etc. The at least one memory 510 may store the software which may be processor-readable, processor-executable software code containing instructions that may be configured to, when executed, cause the at least one processor 512 to perform various functions described herein. Alternatively, the software may not be directly executable by the at least one processor 512 but may be configured to cause the at least one processor 512, e.g., when compiled and executed, to perform the functions. The description herein may refer to the at least one processor 512 performing a function, but this includes other implementations such as where the at least one processor 512 executes software and/or firmware. The description herein may refer to the at least one processor 512 performing a function as shorthand for one or more of the processors performing the function. The description herein may refer to the PRAE 500 performing a function as shorthand for one or more appropriate components of the PRAE 500 performing the function. The at least one processor 512 may include a memory with stored instructions in addition to and/or instead of the at least one memory 510.

The circuits, components, modules, and/or devices of, or associated with, the PRAE 500 and network entity 504 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information may be passed from one circuit, component, module, and/or device to another in varying digital formats without passing through a direct electromagnetic connection.

The environment 502 may include, for example, a TRP 514 (e.g., TRP 300 shown in FIG. 3), a blockage 516, and a UE 518. The PRAE 500, TRP 514, and UE 518 may all be in signal communication with the network entity 504. The PRAE 500 may be a fixed device at a fixed location within the environment 502 or a mobile device that moves within the environment 502.

In an example of operation, the UE 518 may be in signal communication with the network entity 504 via a UE-to-network radio interface 520; however, as the UE 518 travels within the environment 502, at certain locations within the environment 502, the blockage 516 may block or degrade the UE-to-network radio interface 520 between the TRP 514 and UE 518. Under this condition, the communication between the UE 518 and/or network entity 504 may suffer. As such, the PRAE 500 may be configured to assist the network entity 504 by acquiring physical sensory information of the environment 502, with the at least one sensor 506 of the PRAE 500. The PRAE 500 then transmits the positioning data 526 to the network entity 504 based on the acquired physical sensory information. As an example, the PRAE 500 may be configured to acquire sensory information of the position of the blockage 516 relative to the TRP 514 and the UE 518 utilizing the at least one sensor 506. The positioning data 526 is then generated from the acquired sensory information and transmitted to the network entity 504, where the network entity 504 may be configured to determine correction information for positioning signal measurements of the UE 518 within the environment 502 based on the positioning data 526 received from the PRAE 500.

The network entity 504 may be configured to receive, from the positioning data 526 based on physical sensory information and determine correction information for positioning signal measurements of the UE 518.

In this example, the PRAE 500 may be, or include, a graphical reference unit (GRU) or an optional positioning reference unit (PRU). In general, a PRU may be a device, or component, at a known location that can perform positioning measurements (e.g., RSTD, RSRP, UE Rx-Tx Time Difference measurements, etc.) and report these measurements to a network entity 504. In addition, the PRU can transmit SRS to enable TRPs to measure and report UL positioning measurements (e.g., RTOA, UL-AoA, gNB Rx-Tx Time Difference, etc.) from the PRU at the known location. The PRU measurements can be compared by the network entity 504 with the measurements expected at the known PRU location to determine correction terms for other nearby target devices. The DL- and/or UL location measurements for other target devices can then be corrected based on the previously determined correction terms. From the network entity 504 perspective, the PRU functionality may be realized by the PRAE 500 with a known location. If the PRAE 500 includes a PRU, the PRAE 500 may be referred to as joint graphical and PRU (GPRU). Moreover, the network entity 504 may be referred to as an LMF, a 5G Core, and/or a server.

The at least one sensor 506 may be, for example, an image sensor, an acoustic sensor, a radar sensor, a motion detector, and any combination of two or more thereof. If the at least one sensor is, or includes, an image sensor, the type of image sensor may be, for example, a visual camera, a thermographic camera, a light detection and ranging (LiDAR) system, and any combinations thereof. In this example, the physical sensory information may include at least one image of the environment 502 acquired by the image sensor.

Alternatively, or in addition to, if the at least one sensor 506 includes an acoustic sensor, the acoustic sensor may be, for example, an acoustic sensor, an acoustic distance sensor, and/or an ultrasonic sensor. In this example, the physical sensory information acquired by the at least one sensor 506 may include acoustic sensory information of the environment 502. If the at least one sensor 506 includes a radar sensor, the physical sensory information may include backscatter information of the environment 502 acquired by the radar sensor.

In this example, the at least one sensor of the PRAE 500 may receive a signal 522 from the environment 502. The received signal 522 may be a light intensity signal if the at least one sensor 506 is an image sensor. Alternatively, the received signal 522 may be a reflected light signal produced by objects in the environment 502 scattering an optional radiated signal 524. In this example, the radiated signal 524 may be light energy radiated by a LiDAR system in the PRAE 500. In another alternative, the radiated signal 524 may be radiated acoustic energy produced by an acoustic driver/transducer of the PRAE 500 and radiated into the environment 502. In this example, the received signal 522 would be reflected acoustic energy that would be detected by the one or more acoustic sensors. In yet another alternative, the radiated signal 524 may be radar waves produced by the PRAE 500 and radiated into the environment 502. In this example, the received signal 522 would be backscattered information of the environment 502 that would be detected by the one or more radar sensors.

In this example, the physical sensory information produced by graphical measurements of the environment 502 may be utilized to calibrate enhanced positioning (i.e., used for hybrid positioning) or providing monitoring the environment 502 for changes in the environment 502. In this example, the changes in the environment 502 may be determined by comparing correlations of visual, thermal, LiDAR images, radar images, or acoustic measurements over time. These correlations may indicate a change in the environment 502.

As an example of operation, as discussed earlier, the at least one processor 512 of the PRAE 500 may be configured to acquire the physical sensory information, with the at least one sensor 506, of the environment 502 in which the PRAE 500 and the TRP 514 are located and transmit the positioning data 526 from the PRAE 500 to the network entity 504 based on the physical sensory information acquired. The at least one processor in the network entity 504 may be configured to receive, from the PRAE 500, via the at least one transceiver in the network entity 504, the positioning data 526 and determine correction information for positioning signal measurements of the UE 518 based on the positioning data 526 received from the PRAE 500. As such, the PRAE 500 may be configured to obtain graphical, acoustic, or radar measurements (plus optional positioning measurements from the PRU if present in the PRAE 500) and report these measurements to the network entity 504.

In this example, the PRAE 500 may be at a known location or unknown to the network entity 504. As an example, if the location of the PRAE 500 is known within the environment 502, the network entity 504 may utilized the PRAE 500 (as described earlier) to receive the positioning data 526 from the PRAE 500 and determine correction information for positioning signal measurements of target devices within the environment 502 based on the received positioning data 526. However, even if the network entity 504 does not known the location of the PRAE 500 within the environment 502, or only knows a coarse location of the PRAE 500 within the environment 502, the network entity 504 can still use the positioning data 526 from the PRAE 500. As an example, the network entity 504 may utilize the positioning data 526 for monitoring applications within the environment 502. The monitoring applications may include, for example, an artificial intelligence (AI) and/or machine learning (ML) model running an application, functionality, and/or feature related to wireless communication and network management that may include CSI compression and/or prediction, beam prediction, positioning, scheduling, mobility/handover, etc. In general, if the PRAE 500 is in the environment 502, the network entity 504 may utilize the network entity 504 to monitor the environment 502 without having actual knowledge of the location of the PRAE 500 within the environment.

Alternatively, if the location of the PRAE 500 in the environment 502 is known, the location of the PRAE 500 may be provided to the network entity 504. In this case, the location of the PRAE 500 may be relative or absolute. If the location of the PRAE 500 is relative, the location of the PRAE 500 can be a reference to an absolute landmark or platform/frame (e.g., a stand or other fixed support member supporting the PRAE 500). In this example, the location of the PRAE 500 may be referenced to a local coordinate system as part of the platform/frame location. As an example, the platform/frame may be road-side or other open-area structure or element in an outdoor area of the environment 502 or an indoor element such as, for example, a ceiling, wall, or poll mounted device in within a building or structure within the environment 502.

If the PRAE 500 is a mobile device that is traveling within the environment 502, the positioning data 526 provided to the network entity 504 may be utilized to help model or monitor changes in the environment 502. In general, if the PRAE 500 may be part of, or associated with, a mobile device such as a UE or vehicle, the location of the PRAE 500 as it moves within the environment 502 should be known to the network entity 504.

The PRAE 500, through the at least one processor 512, may also transmit, via the at least one transceiver 508, the measurement capabilities of the PRAE 500 to the network entity 504. The PRAE 500 may transmit the measurement capabilities in response to receiving a request for the measurement capabilities from the at least one processor of the network entity 504.

The measurement capabilities may include, for example, the image processing capabilities supported by the image sensor, acoustic processing capabilities of the acoustic sensor, and radar sensing capabilities of the radar sensor, where the image sensor, acoustic sensor, and radar sensor are included in the at least one sensor 506. As an example of an image sensor that is a camera, the PRAE 500 may provide to the network entity 504, a camera location, orientation, focus, zoom, field of view (FoV), image type, image quality, timestamp, along with graphical measurements of the environment 502. In this example, the PRAE 500 may include a control capability that may be configured to control a fixed or variable orientation of the camera that includes a pan, up, down, or side-to-side tilt, or rotation of the camera. This control may be controlled by the PRAE 500 independently, the network entity 504, or both. The PRAE 500 may also include an imaging focus/zooming control, FoV control, and image quality selectability and control. These controls can also be controlled by the PRAE 500 independently, the network entity 504, or both. Furthermore, the PRAE 500 may also include an image and/or acoustic processing and compression capability that supports image and acoustic processing capabilities such as denoising, anti-shake, blur, acoustic directivity (i.e., omnidirectional versus directed acoustic beams), acoustic frequency range, image or acoustic sensitivity, and compression capabilities. If the at least one sensor 506 of the PRAE 500 includes a LiDAR, the PRAE 500 may also include scanning capabilities that include a maximum range, wavelengths, pulse repetition rate, returns per pulse, scan rate (i.e., lines per second), measurement rate, power, and laser class. Moreover, the PRAE 500 may include an image communication capability that supports communication protocols for communicating images with the network entity 504 and reporting capabilities that are configured to report periodicity and quality of reported images.

If the PRAE 500 includes a PRU, the PRU may be configured to perform positioning measurements at a location of the PRAE 500 within the environment 502 and transmit, via the at least one transceiver 508, the positioning measurements to the network entity 504 as at least part of the positioning data 526. The PRU may be further configured to receive a first positioning reference signal (PRS) from the network entity 504, and measure the first PRS, where the positioning measurements includes a second PRS based on the measured first PRS. The network entity 504 may be configured to receive the positioning measurements from the PRAE 500, where the PRAE 500 may be at a known location within the environment 502 and the second PRS. In this example, the at least one processor of the network entity 504 may be further configured to compare the received positioning measurements with expected measurements at the known location of the PRAE 500 to determine correction terms for one or more target devices nearby the known location such as, for example, the UE 518.

The at least one processor of the network entity 504 may be further configured to create a model of the environment 502 from the positioning data 526, and the correction information may be determined from the model. In this example, the model may be a three-dimensional (3D) scene of the environment 502 relative to the PRAE 500 based on the physical sensory information of the environment 502 acquired by the at least one sensor 506 of the PRAE 500, where the physical sensory information may be at least one image of the environment 502, acoustic sensory information or backscatter information of the environment 502 or combinations thereof. Furthermore, in the 3D scene of the environment 502 may be a 3D scene of graphical images, thermographic images, LiDAR images, acoustic sensory information, backscatter information, or combination thereof.

If the at least one sensor 506 includes a motion detector, the at least one processor 512 may be further configured to enable or disable acquisition of the physical sensory information of the at least one sensor 506 based on the motion detector. Alternatively, the at least one processor 512 of the PRAE 500 may be further configured to receive, via the at least one transceiver 508, a command from the network entity 504 to enable or disable acquisition of the physical sensory information by the at least one sensor 506. In this example, the network entity 504 may be configured to activate the PRAE 500 and request measurements from the PRAE 500. The network entity 504 may also be configured to deactivate the PRAE 500 from reporting (i.e., transmission) or making measurements with the at least one sensor 506.

Figure 6:
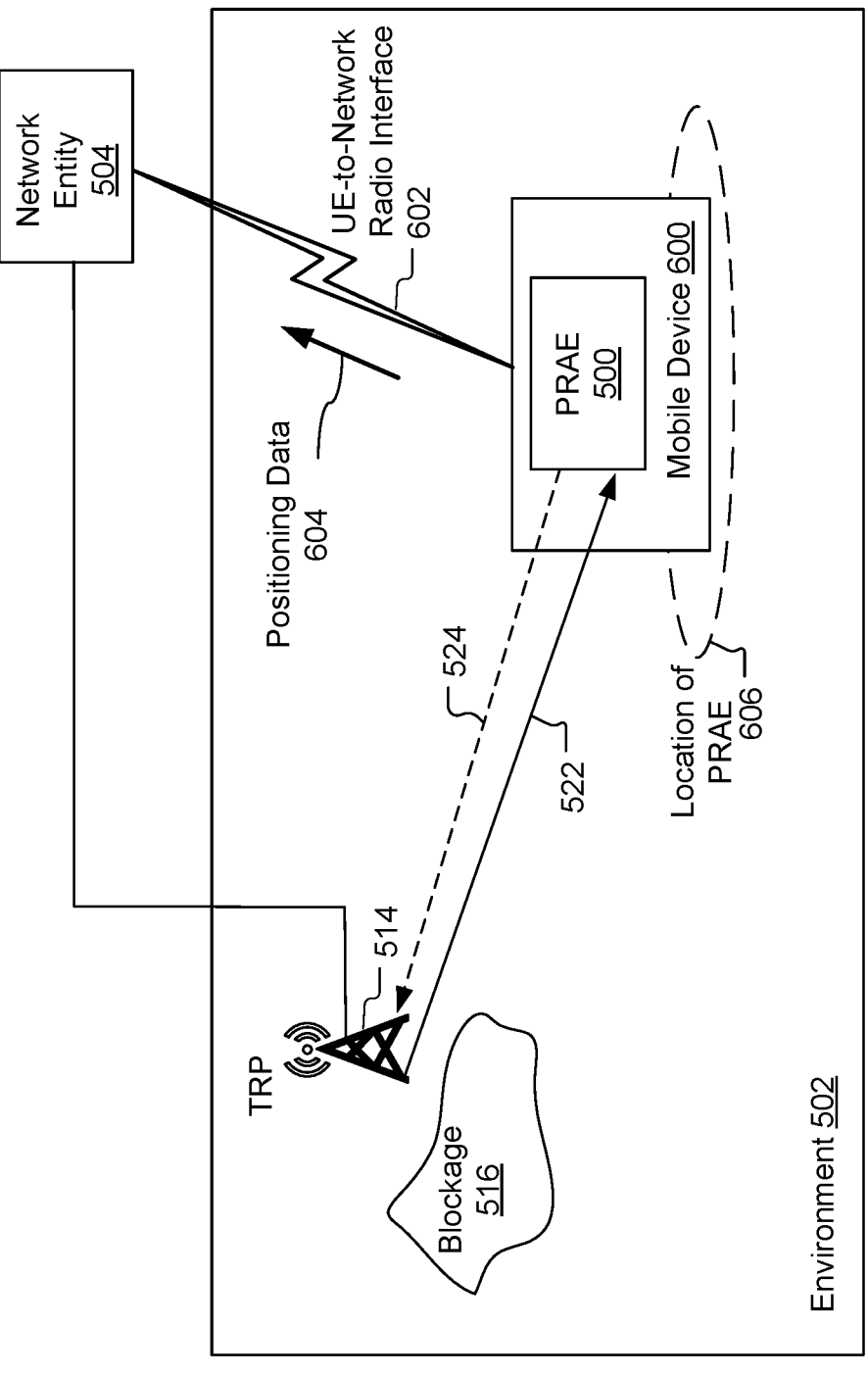
FIG. 6 is a block diagram of a mobile device including the PRAE within the environment and in signal communication with the network entity shown in FIG. 5.

Turning to FIG. 6, a system block diagram of a mobile device 600, including the PRAE 500, is shown. In this example, the PRAE 500 may be part of, or associated with, the mobile device 600 within the environment 502; and the PRAE 500 may be in signal communication with the network entity 504 via a UE-to-network radio interface 602. In this example, the PRAE 500 transmits the positioning data 604 via the UE-to-network radio interface 602. As described earlier, the environment 502 includes the TRP 514 and blockage 516, and the mobile device 600 may be configured to travel within the environment 502. In this example, the mobile device 600 may be a vehicle or a UE a location 606 within the environment 502 and the positioning data 604 provided to the network entity 504 may be utilized to help model or monitor changes in the environment 502. In general, as the mobile device 600 moves within the environment 502, the location 606 of the mobile device (and the PRAE 500) is known to the network entity 504 because the PRAE 500 may be fixed at a known location (e.g., deployed at a fixed known location by, for example, a site owner or mobile network operator) or the PRAE 500 may include a PRU capability where the positioning of the PRAE 500 may be determined with sufficiently high accuracy.

Figure 7:
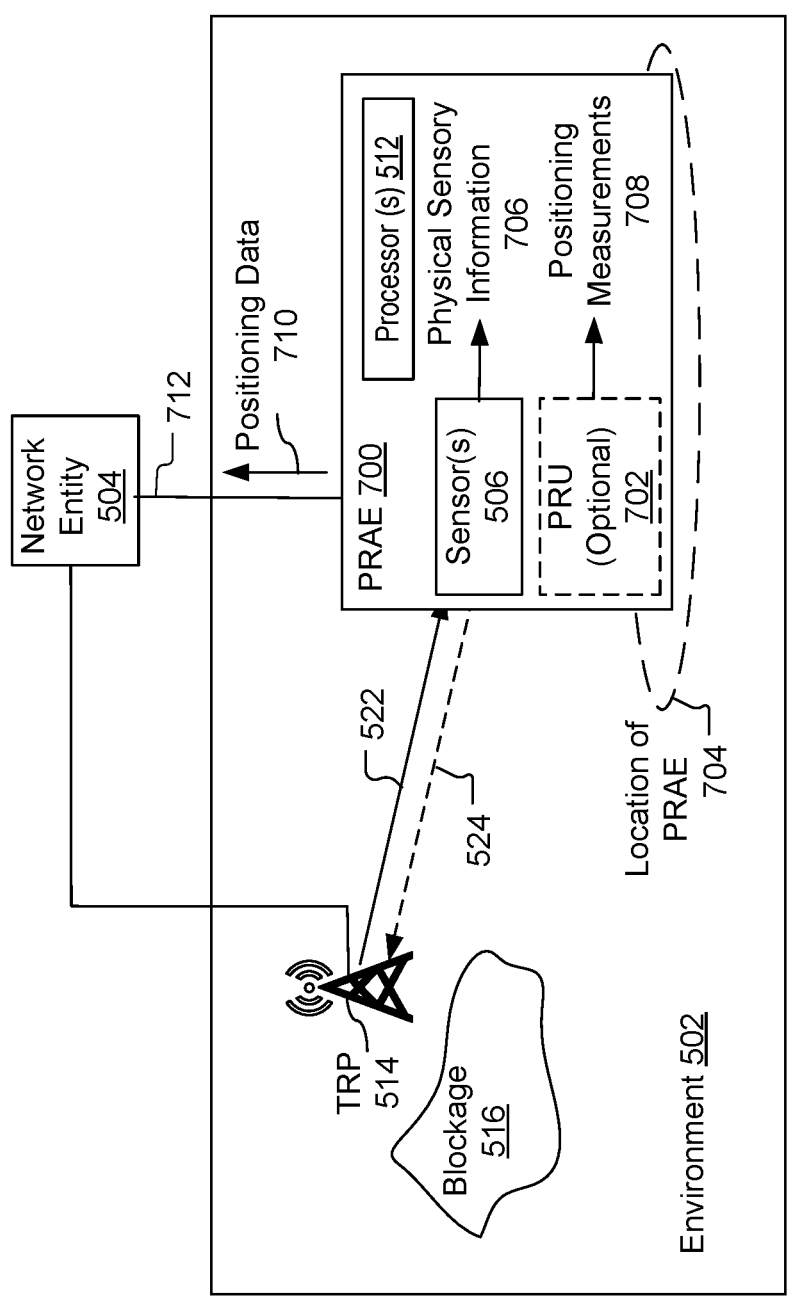
FIG. 7 is a block diagram of the PRAE is shown with an optional PRU associated with the PRAE.

In FIG. 7, a block diagram of the PRAE 700 is shown with the optional PRU 702 associated with the PRAE 700. In this example, the PRAE 700 includes all of the elements of the PRAE 500 described earlier in relation to FIG. 5 including the optional PRU 702. The PRAE 700 may also be part of, or associated with, a mobile device similar to the example described in relation to FIG. 6. In this example, the PRAE 700 may be at a location 704 that is known to the network entity 504; and the at least one sensor 506 produces the physical sensory information 706 and the optional PRU 702 produces the positioning measurements 708. The at least one processor 512 then generates the positioning data 710 from the physical sensory information 706 and the positioning measurements 708 and transmits the positioning data 710 to the network entity 504 via the signal path 712. In this example, the signal path 712 may be a UE-to-network radio interface as describe in relation to FIG. 6.

Figure 8:
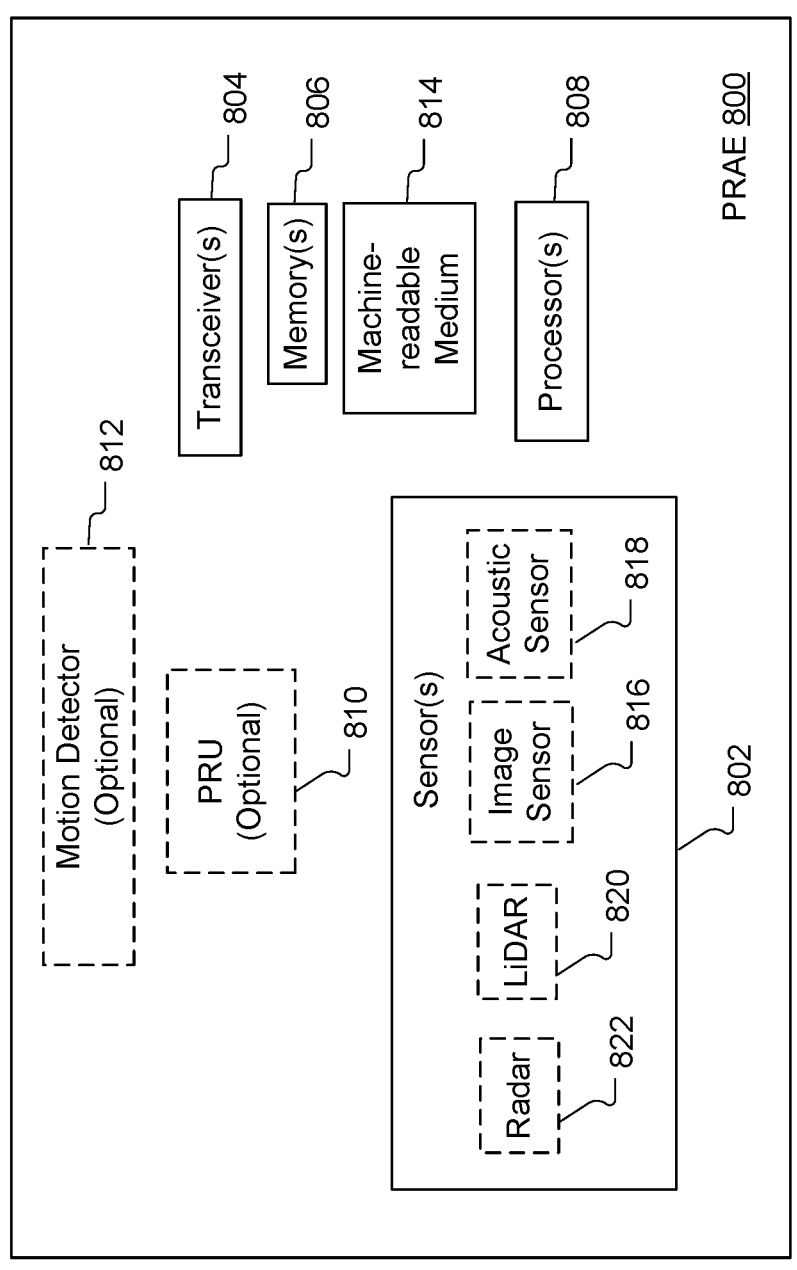
FIG. 8 is a block diagram of the PRAE shown in FIGS. 5-7.

Turning to FIG. 8, a block diagram of the PRAE 800 is shown. As described earlier, the PRAE 800 includes at least one sensor 802, at least one transceiver 804, at least one memory 806, and at least one processor 808. The PRAE 800 may also include the optional PRU 810, optional motion detector 812, and machine-readable medium 814. The optional PRU 810 and motion detector 812 have been described previously. The machine-readable medium 814 may be part of the at least one memory 806 and may include software for the at least one processor 808. In this example the at least one sensor 802 may include an optional image sensor 816, optional acoustic sensor 818, optional LiDAR 820, optional radar 822, or combination of thereof.

Figure 9:
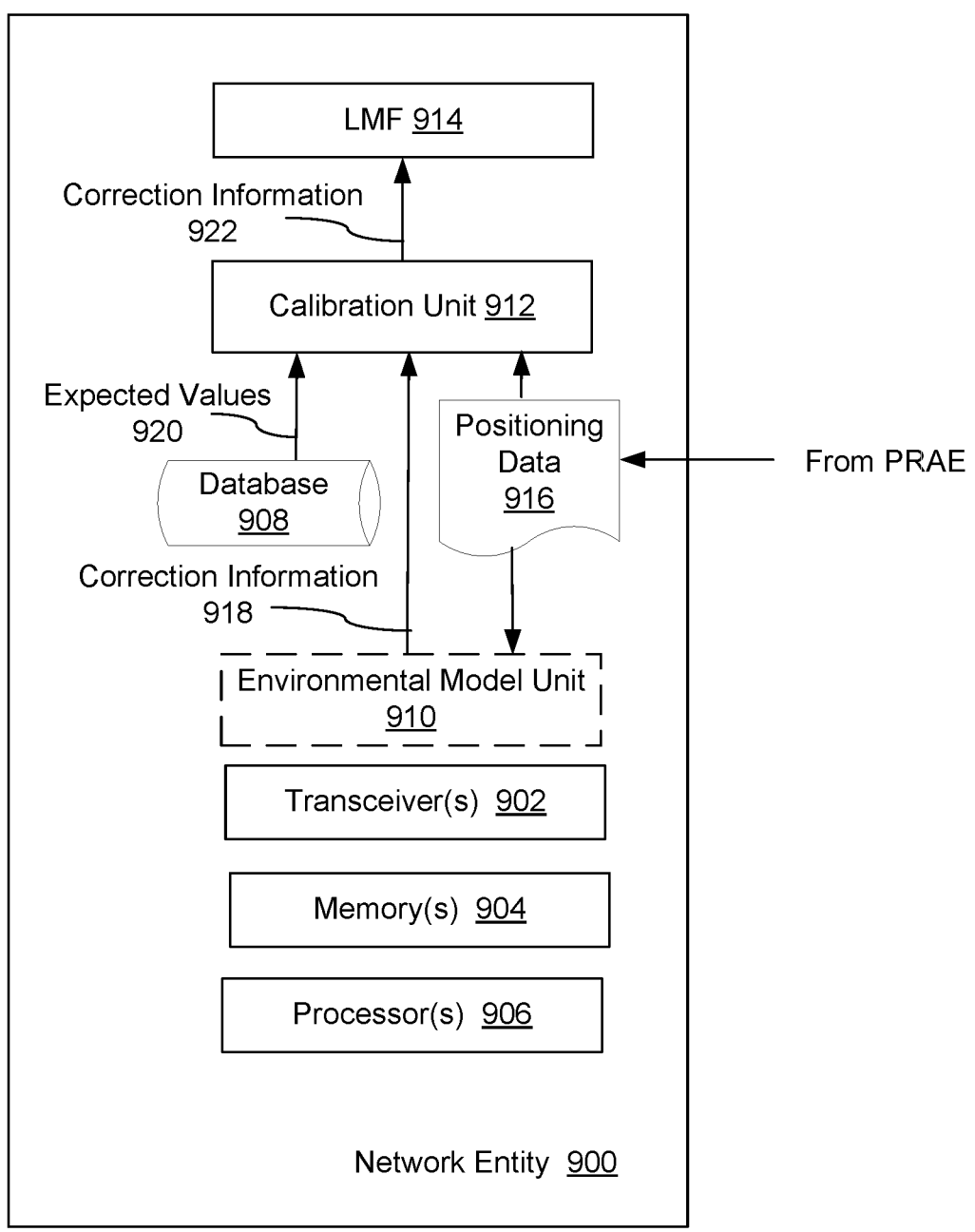
FIG. 9 is a block diagram of the network entity shown in FIG. 4.

FIG. 9 is a block diagram of the network entity 900. The network entity 900 includes at least one transceiver 902, at least one memory 904, and at least one processor 906 as described previously. The network entity 900 may also include a database 908, optional environmental module unit 910, calibration unit 912, and an LMF 914. In general, the database 908 may be stored on the at least one or more memories 904 and the optional environmental module unit 910 and the calibration unit 912 may be hardware or software units that are controlled by the at least one processor 906. The network entity 900 may be configured to receive the positioning data 916 from a PRAE (as described previously) and optionally create a model of the environment 502 from the positioning data 916. As discussed earlier, the model may be, for example, a 3D scene of the environment 502 relative to the PRAE based on the physical sensory information of the environment 502 acquired by the at least one sensor 506 of the PRAE. The correction information 918 may be determined from the model. The database 908 may include expected values 920 of the positioning data for targets or objects within the environment 502. The calibration unit 912 may then receive and compare the expected values 920 and optional correction information 918 against the received positional data 916 from the PRAE to generate correction information 922 that may be passed to a local server such as, for example, LMF 914. As described earlier, the correction information 922 may be utilized by the LMF 914 to correct for positioning signal measurements of a UE or other target devices located nearby the known location within the environment 502 based on the positioning data received 916 from the PRAE.

As an example, the LMF 914 may utilize the positioning data 916 to determine a blocker and/or reflector (e.g., blockage 516) location within the environment and determine a LOS/NLOS state of a UE (e.g., UE 518). Based on this determination the LMF 914 may decide to filter positioning measurements of the UE and correct the position of the UE. In another example, the LMF 914 may utilize the positioning data 916 to determine the blocker and/or reflector location within the environment and determine a potential time of flight, or time of arrival, for positioning signal measurements of the UE and then correct the values reported by the UE. In yet another example, the LMF 914 may utilize the positioning data 916 to determine the blocker and/or reflector location within the environment and determine a potential angle of arrival and/or departure of the positioning signal measurements of the UE and then correct the values reported by the UE.

The at least one processor of the network entity 504 may be further configured to create a model of the environment 502 from the positioning data 526, and the correction information may be determined from the model. In this example, the model may be a three-dimensional (3D) scene of the environment 502 relative to the PRAE 500 based on the physical sensory information of the environment 502 acquired by the at least one sensor 506 of the PRAE 500, where the physical sensory information may be at least one image of the environment 502, acoustic sensory information or backscatter information of the environment 502 or combinations thereof. Furthermore, in the 3D scene of the environment 502 may be a 3D scene of graphical images, thermographic images, LiDAR images, acoustic sensory information, backscatter information, or combination thereof.

Figure 10:
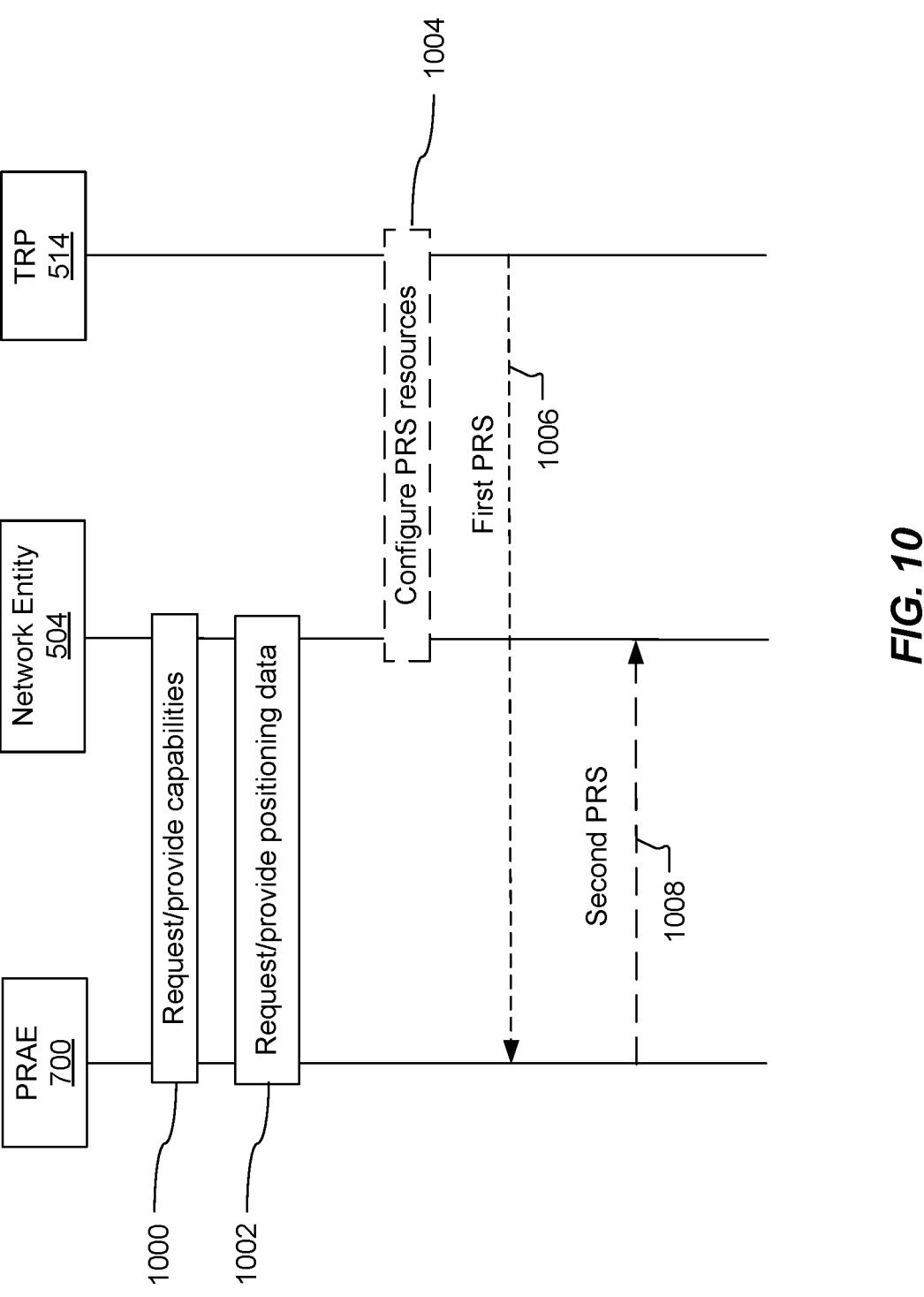
FIG. 10 is a signal and processing flow diagram for providing positioning data from the PRAE to the network entity shown in FIG. 7.

Turning to FIG. 10, a signal and processing flow diagram for providing positioning data 710 from the PRAE 700 (shown in FIG. 7) to the network entity 504 is shown. The process may begin when the network entity 504 requests 1000 the measurement capabilities of the PRAE 700 and, in response, the PRAE 700 provides the network entity 504 with the measurement capabilities of the PRAE 700. Then the network entity 504 requests 1002 the positioning data 710 from the PRAE 700 and the PRAE 700 provides the positioning data to the network entity 504. If the PRAE 700 includes the optional PRU 702, the network entity 504 configures 1004 the PRS resources of the TRP 514 and, in response, the TRP 514 transmits 1006 a first PRS to the PRAE 700. In response, the optional PRU 702 generates a second PRS based on measurements of the first PRS from the TRP 514. The PRAE 700 then transmits 1008 the second PRS to the network entity 504. Alternatively, the optional PRU 702 may generate the positioning measurements 708 that include the second PRS; and the PRAE 700 may transmit 1002 the positioning data 710 to the network entity 504 that includes the physical sensory information 706 produced by the PRAE 700 and positioning measurements 708 produced by the optional PRU 702.

In FIG. 11, a flowchart diagram of a method 1100 for the providing positioning data 526 from the PRAE 500 (shown in FIG. 5) to the network entity 504 is shown. The method 1100 includes receiving 1102 a request for the measurement capabilities of the PRAE 500 from the network entity 504 by the PRAE 500 and, in response, transmitting 1104 the measurement capabilities of the PRAE 500 to the network entity 504. The method 1100 further includes receiving 1106 a request for the positioning data 526 from the network entity 504 at the PRAE 500, acquiring 1108 physical sensory information of the environment 502 in which the PRAE 500 and the TRP 514 are located, and transmitting 1110 the positioning data 526 from the PRAE 500 to the network entity 504 based on the physical sensory information.

Turning to FIG. 12, a flowchart diagram of a method 1200 for receiving the positioning data 526 from the PRAE 500 at the network entity 504 is shown. The method 1200 includes transmitting 1202 a request for measurement capabilities of the PRAE 500 and, in response, receiving 1204 the measurement capabilities of the PRAE 500. The method 1200 further includes transmitting 1206 a request for the positioning data 526, receiving 1208 the positioning data 526 based on physical sensory information of an environment 502 acquired by at least one sensor of the PRAE 500, and determining 1210 correction information for positioning signal measurements of a UE 518 located within the environment 502 based on the positioning data 526 received from the PRAE 500.

IMPLEMENTATION EXAMPLES

Implementation examples are provided in the following numbered clauses.

Clause 1. A positioning reference assistance entity (PRAE) for providing positioning data to a network entity of a communication network having at least one transmission/reception point (TRP), the PRAE comprising: at least one sensor; at least one transceiver; at least one memory; and at least one processor, in signal communication with the at least one transceiver and the at least one memory, configured to: acquire physical sensory information, from the at least one sensor, of an environment in which the PRAE and the TRP are located; and transmit, via the at least one transceiver, the positioning data to the network entity based on the physical sensory information.

Clause 2. The PRAE of clause 1, further comprises a positioning reference unit (PRU), wherein the PRU is configured to perform positioning measurements at a location of the PRAE within the environment and transmit, via the at least one transceiver, the positioning measurements to the network entity as at least part of the positioning data.

Clause 3. The PRAE of clause 2, wherein the PRU is further configured to receive a first positioning reference signal (PRS) from the network entity, and measure the first PRS, and the positioning measurements includes a second PRS based on the measured first PRS.

Clause 4. The PRAE of clause 1, wherein the at least one sensor is selected from a group consisting of an image sensor, an acoustic sensor, a radar sensor, and any combination of two or more thereof.

Clause 5. The PRAE of clause 4, wherein the at least one sensor comprises the image sensor, and the image sensor is selected from a group consisting of a visual camera, a thermographic camera, a light detection and ranging (LiDAR) system, and combinations thereof, and the physical sensory information includes at least one image of the environment acquired by the image sensor.

Clause 6. The PRAE of clause 4, wherein the at least one sensor comprises the acoustic sensor, and the physical sensory information includes acoustic sensory information of the environment acquired by the acoustic sensor.

Clause 7. The PRAE of clause 4, wherein the at least one sensor comprises the radar sensor, and the physical sensory information includes backscatter information of the environment acquired by the radar sensor.

Clause 8. The PRAE of clause 1, wherein the at least one processor is further configured to: transmit, via the at least one transceiver, measurement capabilities of the PRAE to the network entity.

Clause 9. The PRAE of clause 8, wherein the at least one sensor is selected from a group consisting of an image sensor, an acoustic sensor, a radar sensor, and any combination of two or more thereof, and the measurement capabilities include at least one of image processing capabilities supported by the image sensor, acoustic processing capabilities of the acoustic sensor, and radar sensing capabilities of the radar sensor.

Clause 10. The PRAE of clause 8, wherein the at least one processor is further configured to: receive, via the at least one transceiver, a request from the network entity for the measurement capabilities of the PRAE.

Clause 11. The PRAE of clause 10, wherein the at least one processor is further configured to: receive, via the at least one transceiver, a request from the network entity for the positioning data.

Clause 12. The PRAE of clause 1, wherein the at least one sensor includes a motion detector and wherein the at least one processor is further configured to enable or disable acquisition of the physical sensory information based on the motion detector.

Clause 13. The PRAE of clause 1, wherein the at least one processor is further configured to: receive, via the at least one transceiver, a command from the network entity to enable or disable acquisition of the physical sensory information.

Clause 14. A method for providing positioning data to a network entity of a communication network having at least one transmission/reception point (TRP) utilizing a positioning reference assistance entity (PRAE), the method comprising: acquiring physical sensory information, with at least one sensor of the PRAE, of an environment in which the PRAE and the TRP are located; and transmitting the positioning data from the PRAE to the network entity based on the physical sensory information.

Clause 15. The method of clause 14, further comprising: performing positioning measurements, with a positioning reference unit (PRU) of the PRAE, at a known location of the PRAE within the environment; and transmitting the positioning measurements from the PRAE to the network entity as part of the positioning data.

Clause 16. The method of clause 15, further including receiving a first positioning reference signal (PRS) from the network entity, and measuring the first PRS, wherein the positioning measurements includes a second PRS based on the measured first PRS.

Clause 17. The method of clause 14, wherein the physical sensory information is selected from a group consisting of: at least one image of the environment; acoustic sensory information of the environment; backscatter information of the environment; and combinations thereof.

Clause 18. The method of clause 14, further including transmitting measurement capabilities of the PRAE to the network entity.

Clause 19. The method of clause 18, wherein the measurement capabilities include image processing capabilities, acoustic processing capabilities, radar sensing capabilities, or combinations thereof.

Clause 20. The method of clause 19, further including receiving a request for the measurement capabilities of the PRAE from the network entity.

Clause 21. The method of clause 20, further including receiving a request for the positioning data from the network entity.

Clause 22. The method of clause 14, further including enabling or disabling the acquisition of the physical sensory information based on a motion detector of the PRAE.

Clause 23. The method of clause 14, further including receiving a command from the network entity to enable or disable the acquisition of the physical sensory information.

Clause 24. A network entity for a communication network in signal communication with a positioning reference assistance entity (PRAE) and at least one transmission/reception point (TRP), the network entity comprising: at least one transceiver; at least one memory; and at least one processor, in signal communication with the at least one transceiver, and the at least one memory, configured to: receive, from the PRAE via the at least one transceiver, positioning data based on physical sensory information of an environment acquired by at least one sensor of the PRAE, wherein the PRAE and the at least one TRP are located within the environment; and determine correction information for positioning signal measurements of a user equipment (UE) located within the environment based on the positioning data received from the PRAE.

Clause 5. The network entity of clause 24, wherein the at least one processor is further configured to receive positioning measurements from the PRAE at a known location within the environment, wherein the positioning data includes the positioning measurements.

Clause 26. The network entity of clause 25, wherein the at least one processor is further configured to transmit a first positioning reference signal (PRS) to the PRAE, and receive a second PRS, from the PRAE, and the second PRS is based on measurements of the first PRS by the PRAE.

Clause 27. The network entity of clause 26, wherein the at least one processor is further configured to compare the received positioning measurements with expected measurements at the known location of the PRAE to determine correction information for one or more target devices nearby the known location.

Clause 28. The network entity of clause 24, wherein the at least one processor is configured to receive the positioning data based on the physical sensory information of the environment, and wherein the physical sensory information is selected from a group consisting of: at least one image of the environment; acoustic sensory information of the environment; backscatter information of the environment; and combinations thereof.

Clause 29. The network entity of clause 24, wherein the at least one processor is further configured to transmit, via the at least one transceiver, a request for measurement capabilities of the PRAE that include image processing capabilities, acoustic processing capabilities, and radar sensing capabilities.

Clause 30. The network entity of clause 24, wherein the at least one processor is further configured to transmit, via the at least one transceiver, a command to enable or disable the at least one sensor of the PRAE.

Clause 31. The network entity of clause 24, wherein the at least one processor is further configured to create a model of the environment from the positioning data, and the correction information is determined from the model.

Clause 32. The network entity of clause 31, wherein the model is a three-dimensional (3D) scene of the environment relative to the PRAE based on the physical sensory information of the environment acquired by the at least one sensor of the PRAE, and wherein the physical sensory information is selected from a group consisting of: at least one image of the environment; acoustic sensory information of the environment; backscatter information of the environment; and combinations thereof.

Clause 33. The network entity of clause 32, wherein the 3D scene of the environment is 3D scene of graphical images, thermographic images, light detection and ranging (LiDAR) images, acoustic sensory information, backscatter information, or combination thereof.

Clause 34. A method for receiving positioning data from a positioning reference assistance entity (PRAE) at a network entity of a communication network having at least one transmission/reception point (TRP), the method comprising: receiving, from the PRAE, positioning data based on physical sensory information of an environment acquired by at least one sensor of the PRAE, wherein the PRAE and the at least one TRP are located within the environment; and determining correction information for positioning signal measurements of a user equipment (UE) located within the environment based on the positioning data received from the PRAE.

Clause 35. The method of clause 34, further including receiving positioning measurements from the PRAE at a known location within the environment, wherein the positioning data includes the positioning measurements.

Clause 36. The method of clause 35, further including transmitting a first positioning reference signal (PRS) to the PRAE, and receiving a second PRS, from the PRAE, wherein the second PRS is based on measurements of the first PRS by the PRAE.

Clause 37. The method of clause 36, further including comparing the received positioning measurements with expected measurements at the known location of the PRAE to determine correction information for one or more target devices nearby the known location.

Clause 38. The method of clause 34, further including receiving the positioning data based on the physical sensory information of the environment, wherein the physical sensory information is selected from a group consisting of: at least one image of the environment; acoustic sensory information of the environment; backscatter information of the environment; and combinations thereof.

Clause 39. The network entity of clause 34, further including transmitting a request for measurement capabilities of the PRAE that include image processing capabilities, acoustic processing capabilities, and radar sensing capabilities.

Clause 40. The method of clause 34, further including transmitting a command to enable or disable the at least one sensor of the PRAE.

Clause 41. The method of clause 34, further including creating a model of the environment from the positioning data, wherein the correction information is determined from the model.

Clause 42. The method of clause 41, wherein the model is a three-dimensional (3D) scene of the environment relative to the PRAE based on the physical sensory information of the environment acquired by the at least one sensor of the PRAE, and wherein the physical sensory information is selected from a group consisting of: at least one image of the environment; acoustic sensory information of the environment; backscatter information of the environment; and combinations thereof.

Clause 43. The method of clause 42, wherein the 3D scene of the environment is 3D scene of graphical images, thermographic images, light detection and ranging (LiDAR) images, acoustic sensory information, backscatter information, or combination thereof.

Clause 44. A positioning reference assistance entity (PRAE) for providing positioning data to a network entity of a communication network having at least one transmission/reception point (TRP), the PRAE comprising: means for acquiring physical sensory information, with at least one sensor of the PRAE, of an environment in which the PRAE and the TRP are located; and means for transmitting the positioning data from the PRAE to the network entity based on the physical sensory information.

Clause 45. The PRAE of clause 44, further comprising: means for performing positioning measurements, with a positioning reference unit (PRU) of the PRAE, at a known location of the PRAE within the environment; and means for transmitting the positioning measurements from the PRAE to the network entity as part of the positioning data.

Clause 46. The PRAE of clause 45, further including means for receiving a first positioning reference signal (PRS) from the network entity, and means for measuring the first PRS, wherein the positioning measurements includes a second PRS based on the measured first PRS.

Clause 47. The PRAE of clause 44, wherein the physical sensory information is selected from a group consisting of: at least one image of the environment; acoustic sensory information of the environment; backscatter information of the environment; and combinations thereof.

Clause 48. The PRAE of clause 44, further including means for transmitting measurement capabilities of the PRAE to the network entity.

Clause 49. The PRAE of clause 48, wherein the measurement capabilities include image processing capabilities, acoustic processing capabilities, radar sensing capabilities, or combinations thereof.

Clause 50. The PRAE of clause 49, further including means for receiving a request for the measurement capabilities of the PRAE from the network entity.

Clause 51. The PRAE of clause 50, further including means for receiving a request for the positioning data from the network entity.

Clause 52. The PRAE of clause 44, further including means for enabling or disabling the acquisition of the physical sensory information based on a motion detector of the PRAE.

Clause 53. The PRAE of clause 44, further including means for receiving a command from the network entity to enable or disable the acquisition of the physical sensory information.

Clause 54. A network entity for a communication network in signal communication with a positioning reference assistance entity (PRAE) and at least one transmission/reception point (TRP), the network entity comprising: means for receiving, from the PRAE via at least one transceiver, positioning data based on physical sensory information of an environment acquired by at least one sensor of the PRAE, wherein the PRAE and the at least one TRP are located within the environment; and means for determining correction information for positioning signal measurements of a user equipment (UE) located within the environment based on the positioning data received from the PRAE.

Clause 55. The network entity of clause 54, further including means for receiving positioning measurements from the PRAE at a known location within the environment, wherein the positioning data includes the positioning measurements.

Clause 56. The network entity of clause 55, further including means for transmitting a first positioning reference signal (PRS) to the PRAE, and means for receiving a second PRS, from the PRAE, wherein the second PRS is based on measurements of the first PRS by the PRAE.

Clause 57. The network entity of clause 56, further including means for comparing the received positioning measurements with expected measurements at the known location of the PRAE to determine correction information for one or more target devices nearby the known location.

Clause 58. The network entity of clause 54, further including means for receiving the positioning data based on the physical sensory information of the environment, wherein the physical sensory information is selected from a group consisting of: at least one image of the environment; acoustic sensory information of the environment; backscatter information of the environment; and combinations thereof.

Clause 59. The network entity of clause 54, further including means for transmitting a request for measurement capabilities of the PRAE that include image processing capabilities, acoustic processing capabilities, and radar sensing capabilities.

Clause 60. The network entity of clause 54, further including transmitting a command to enable or disable the at least one sensor of the PRAE.

Clause 61. The network entity of clause 54, further including creating a model of the environment from the positioning data, wherein the correction information is determined from the model.

Clause 62. The network entity of clause 61, wherein the model is a three-dimensional (3D) scene of the environment relative to the PRAE based on the physical sensory information of the environment acquired by the at least one sensor of the PRAE, and wherein the physical sensory information is selected from a group consisting of: at least one image of the environment; acoustic sensory information of the environment; backscatter information of the environment; and combinations thereof.

Clause 63. The network entity of clause 62, wherein the 3D scene of the environment is 3D scene of graphical images, thermographic images, light detection and ranging (LiDAR) images, acoustic sensory information, backscatter information, or combination thereof.

Clause 64. A non-transitory processor-readable storage medium comprising processor-readable instructions configured to cause one or more processors to providing positioning data to a network entity of a communication network having a positioning reference assistance entity (PRAE) and at least one transmission/reception point (TRP), comprising: code for acquiring physical sensory information, from at least one sensor, of an environment in which the PRAE and the TRP are located; and code for transmitting, via at least one transceiver, the positioning data to the network entity based on the physical sensory information.

Clause 65. A non-transitory processor-readable storage medium comprising processor-readable instructions configured to cause one or more processors of a network entity to produce correction information utilizing a positioning reference assistance entity (PRAE) and at least one transmission/reception point (TRP), comprising: code for receiving, from the PRAE via at least one transceiver, positioning data based on physical sensory information of an environment acquired by at least one sensor of the PRAE, wherein the PRAE and the at least one TRP are located within the environment; and code for determining the correction information for positioning signal measurements of a user equipment (UE) located within the environment based on the positioning data received from the PRAE.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A positioning reference assistance entity (PRAE) for providing positioning data to a network entity of a communication network having at least one transmission/reception point (TRP), the PRAE comprising:

at least one sensor;
at least one transceiver;
at least one memory; and
at least one processor, in signal communication with the at least one transceiver and the at least one memory, configured to:
acquire physical sensory information, from the at least one sensor, of an environment in which the PRAE and the TRP are located, the physical sensory information including at least one of image data, acoustic data, and backscatter data;
determine the positioning data based on the physical sensory information, the positioning data including information corresponding to at least one of a first position of a target in the environment and a second position of an object in the environment; and
transmit, via the at least one transceiver, the positioning data to the network entity.

2. The PRAE of claim 1, further comprises
a positioning reference unit (PRU),
wherein the PRU is configured to
perform positioning measurements at a location of the PRAE within the environment and
transmit, via the at least one transceiver, the positioning measurements to the network entity as at least part of the positioning data.

3. The PRAE of claim 2, wherein
the PRU is further configured to
receive a first positioning reference signal (PRS) from the network entity, and
measure the first PRS, and the positioning measurements include a second PRS based on the measured first PRS.

4. The PRAE of claim 1, wherein the at least one sensor is selected from a group consisting of an image sensor, an acoustic sensor, a radar sensor, and any combination of two or more thereof.

5. The PRAE of claim 4, wherein
the at least one sensor comprises the image sensor, and
the image sensor is selected from a group consisting of
a visual camera,
a thermographic camera,
a light detection and ranging (LiDAR) system, and
combinations thereof, and
the physical sensory information includes at least one image of the environment acquired by the image sensor.

6. The PRAE of claim 4, wherein
the at least one sensor comprises the acoustic sensor, and
the physical sensory information includes acoustic sensory information of the environment acquired by the acoustic sensor.

7. The PRAE of claim 4, wherein
the at least one sensor comprises the radar sensor, and
the physical sensory information includes backscatter information of the environment acquired by the radar sensor.

8. The PRAE of claim 1, wherein the at least one processor is further configured to: transmit, via the at least one transceiver, measurement capabilities of the PRAE to the network entity.

9. The PRAE of claim 8, wherein
the at least one sensor is selected from a group consisting of an image sensor, an acoustic sensor, a radar sensor, and any combination of two or more thereof, and
the measurement capabilities include at least one of
image processing capabilities supported by the image sensor,
acoustic processing capabilities of the acoustic sensor, and
radar sensing capabilities of the radar sensor.

10. The PRAE of claim 8, wherein the at least one processor is further configured to: receive, via the at least one transceiver, a request from the network entity for the measurement capabilities of the PRAE.

11. The PRAE of claim 10, wherein the at least one processor is further configured to: receive, via the at least one transceiver, a request from the network entity for positioning data.

12. The PRAE of claim 1,
wherein the at least one sensor includes a motion detector and
wherein the at least one processor is further configured to enable or disable acquisition of the physical sensory information based on the motion detector.

13. The PRAE of claim 1, wherein the at least one processor is further configured to: receive, via the at least one transceiver, a command from the network entity to enable or disable acquisition of the physical sensory information.

14. A method for providing positioning data to a network entity of a communication network having at least one transmission/reception point (TRP) utilizing a positioning reference assistance entity (PRAE), the method comprising:
acquiring physical sensory information, with at least one sensor of the PRAE, of an environment in which the PRAE and the TRP are located, the physical sensory information including at least one of image data, acoustic data, and backscatter data;

determining the positioning data based on the physical sensory information, the positioning data including information corresponding to at least one of a first position of a target in the environment and a second position of an object in the environment; and transmitting the positioning data from the PRAE to the network entity.

15. The method of claim 14, further comprising:

performing positioning measurements, with a positioning reference unit (PRU) of the PRAE, at a known location of the PRAE within the environment; and transmitting the positioning measurements from the PRAE to the network entity as part of the positioning data.

16. The method of claim 15, further including receiving a first positioning reference signal (PRS) from the network entity, and measuring the first PRS, wherein the positioning measurements includes a second PRS based on the measured first PRS.

17. The method of claim 14, wherein the physical sensory information is selected from a group consisting of: at least one image of the environment; acoustic sensory information of the environment; backscatter information of the environment; and combinations thereof.

18. The method of claim 14, further comprising transmitting measurement capabilities of the PRAE to the network entity.

19. The method of claim 18, wherein the measurement capabilities include image processing capabilities, acoustic processing capabilities, radar sensing capabilities, or combinations thereof.

20. The method of claim 19, further including receiving a request for the measurement capabilities of the PRAE from the network entity.

21. The method of claim 20, further including receiving a request for the positioning data from the network entity.

22. The method of claim 14, further including enabling or disabling the acquisition of the physical sensory information based on a motion detector of the PRAE.

23. The method of claim 14, further including receiving a command from the network entity to enable or disable the acquisition of the physical sensory information.

24. A positioning reference assistance entity (PRAE) for providing positioning data to a network entity of a communication network having at least one transmission/reception point (TRP), the PRAE comprising:

means for acquiring physical sensory information, with at least one sensor of the PRAE, of an environment in which the PRAE and the TRP are located, the physical sensory information including at least one of image data, acoustic data, and backscatter data;

means for determining the positioning data based on the physical sensory information, the positioning data including information corresponding to at least one of a first position of a target and a second position of an object in the environment; and means for transmitting the positioning data from the PRAE to the network entity.

25. The PRAE of claim 24, further comprising:

means for performing positioning measurements, with a positioning reference unit (PRU) of the PRAE, at a known location of the PRAE within the environment; and means for transmitting the positioning measurements from the PRAE to the network entity as part of the positioning data.

26. The PRAE of claim 24, wherein the physical sensory information is selected from a group consisting of: at least one image of the environment; acoustic sensory information of the environment; backscatter information of the environment; and combinations thereof.

27. The PRAE of claim 24, further including means for transmitting measurement capabilities of the PRAE to the network entity.

28. The PRAE of claim 24, further including means for enabling or disabling the acquisition of the physical sensory information based on a motion detector of the PRAE.

29. The PRAE of claim 24, further including means for receiving a command from the network entity to enable or disable the acquisition of the physical sensory information.

30. A non-transitory processor-readable storage medium comprising processor-readable instructions configured to cause one or more processors to providing positioning data to a network entity of a communication network having a positioning reference assistance entity (PRAE) and at least one transmission/reception point (TRP), comprising:

code for acquiring physical sensory information, from at least one sensor, of an environment in which the PRAE and the TRP are located, the physical sensory information including at least one of image data, acoustic data, and backscatter data;

determine the positioning data based on the physical sensory information, the positioning data including information corresponding to at least one of a first position of a target and a second position of an object in the environment; and code for transmitting, via at least one transceiver, the positioning data to the network entity.

* * * * *